Oct. 12, 1926.
F. H. BUCKINGHAM
DASHPOT
Filed Nov. 1, 1924
1,602,604
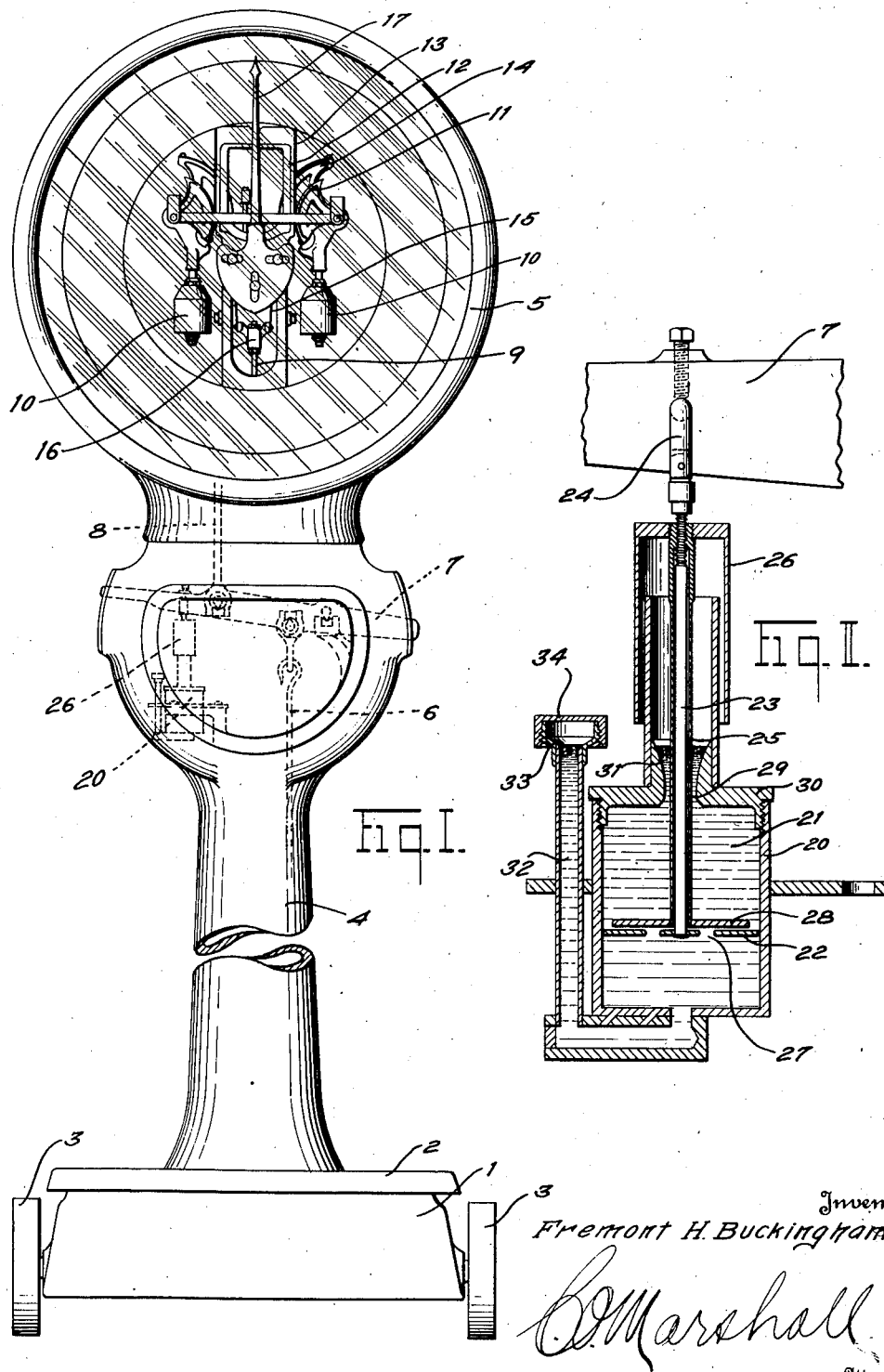
Inventor
Fremont H. Buckingham.
C.D. Marshall
Attorney Patented Oct. 12, 1926.

1,602,604

UNITED STATES PATENT OFFICE.

FREMONT H. BUCKINGHAM, OF DETROIT, MICHIGAN, ASSIGNOR TO TOLEDO SCALE COMPANY, OF TOLEDO, OHIO, A CORPORATION OF NEW JERSEY.

DASHPOT.

Application filed November 1, 1924. Serial No. 747,399.

This invention relates to weighing scales, and more particularly to means for damping the vibrations or oscillatory movements of the weighing mechanism.

One of the principal objects of this invention is the provision of a vibration damping device having a means for preventing the slopping out and spilling of the fluid when such device is in operation.

Another object is the provision of a dash pot which will prevent sudden upward as well as sudden downward movement of the plunger.

Another object is the provision of a dash pot in which resistance to upward movement of the plunger is not limited to atmospheric pressure.

Another object is the provision of a device of this character which is applicable to numerous types of scales, whether counter scales of comparatively low capacity or those of the heavy capacity type where an efficient retarding effect is necessary to the successful operation of the scale.

Still another object is the provision of a dash pot which is readily accessible for purpose of refilling.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a scale embodying my invention; and

Figure II is an enlarged vertical sectional view showing the dash pot and adjacent parts.

Referring to the drawings in detail, I have illustrated my invention as incorporated in a weighing scale of the so-called portable type. It is to be understood, however, that my invention may be employed wherever adaptable, and, as the scale per se forms no part of my invention, I will describe it only in such detail as to explain the application of my invention thereto.

The base 1 of the scale forms a housing within which is contained the platform lever mechanism (not shown) supporting the load-receiving platform 2, the base being equipped with rollers 3 to facilitate transportation of the scale. Erected upon one end of the base 1 is a column 4 surmounted by a watch-case-shaped housing 5 within which is housed and supported the load-counterbalancing mechanism. The platform lever mechanism is operatively connected by means of a link 6 to an intermediate lever 7, the latter suitably fulcrumed within the flaring upper portion of the column 4. The lever 7 is connected to the load-counterbalancing mechanism by means of links 8 and 9 and other mechanism (not shown).

The load-counterbalancing mechanism consists of a pair of pendulums 10, the latter provided with curved sectors 11 suspended from a frame 12 by means of flexible metallic ribbons 13. Power sectors 14 forming integral portions of the pendulums are connected by flexible metallic ribbons 15 to a yoke or equalizer 16 secured to the upper extremity of the link 9. It will be apparent that a load placed upon the platform 2 would exert a downward pull on the link 6, resulting in a counter-clockwise movement of the lever 7, and through the medium of the links 8 and 9 cause the pendulums to move upwardly and outwardly to counterbalance the load. The indicator hand 17 is suitably operated through rack and pinion mechanism (not shown) and is adapted to swing over a graduated chart to indicate the weight of the load.

The device of my invention for damping the oscillatory motions of the weighing mechanism is connected to the lever 7, and consists of a cylindrical cup-like chamber 20 within which is contained a liquid damping medium 21. Adapted to operate in the liquid 21 is a piston or plunger 22 fixed to the lower extremity of a rod 23, the upper end of the rod being connected to an arm 24 adjustably secured in an opening in the lever 7. A sleeve 25 surrounding the rod 23 is provided with an internally threaded portion which receives the threaded end of the rod 23, said sleeve also having a dust cover 26 fixed to the upper end thereof. It will be apparent that as the lever 7 and plunger 22 oscillate during weighing movements, the damping fluid 21 tends to retard such movements, the fluid moving from one side of the plunger 22 to the other through openings 27 in the plunger. In order that the retarding effect of the fluid may be controlled and adjusted, I have provided a disk 28 fixed to the sleeve 25 normally in juxtaposition to the plunger 22, thus effectively closing the openings 27. If the retarding effect of the fluid is too great, the disk 28 may be moved away from the plunger and admit the passage of more fluid by rotating the dust cover 26, thus screwing up the sleeve 25 and disk 28 relative to the rod 23.

In the construction of a fluid dash pot, which is a vital element in the successful operation of a weighing scale, one of the troubles sometimes encountered is the splashing and spurting of the fluid when a load is thrown upon the platform and the plunger is jerked upwardly or suddenly forced down in the fluid. To prevent such splashing the opening 29 in the dash pot cover 30 through which the sleeve and rod operate is made comparatively small to admit the passage of only a small quantity of liquid. The walls of the opening are flared, as at 31, and the cross sectional surface area of the upper portion of the opening is increased materially. With such a construction the velocity of the fluid through the narrow portion of the opening 29 is relatively fast during weighing movements, but as the fluid is forced upwardly by the plunger the velocity of the fluid is proportionately decreased as the area of the opening is increased, and with the decreased velocity of the fluid the tendency of said fluid to splash or spurt out is obviated.

When the plunger of a dash pot is suddenly pulled upwardly with a force greater than the atmospheric pressure on the top of the liquid, the liquid will be lifted in the dash pot, leaving a partial vacuum beneath. In order to resist such exceptional pulls the dash pot must sometimes be made inconveniently large. The dash pot of my invention in use is filled to a level above the throat of the opening 29 and the plunger, therefore, cannot "pull a vacuum" without forcing the liquid through the narrow throat.

In order to make it possible to fill the dash pot without disassembling the parts, I have provided a filler tube 32 adjacent the body portion of the dash pot through which the liquid may be poured. It also serves as a gage to determine when the dash pot is filled to the proper level. This is indicated when the liquid reaches the flaring portion 33 of the tube. A threaded cap or cover 34 lightly encloses the end of the filler tube to prevent the oil from being forced out by movement of the plunger.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a chamber, a fluid contained therein, and an opening in said chamber, the walls of said opening being formed to effect a decrease in velocity of fluid in passing through said opening, the walls of said opening constituting an addition to the fluid holding space within said chamber.

2. In a device of the class described, in combination, a container for a fluid, said container having a reduced portion, a restricted opening between said container and reduced portion thereof, the walls of said reduced portion being flared to effect a decrease in the velocity of the fluid in passing from the container to the reduced portion, said container adapted to be normally filled with fluid to a point above the level of said opening.

3. In a device of the class described, in combination, a chamber having an opening, fluid filling said chamber to above the level of said opening, and a plunger movable in said chamber and having its stem passing through such opening, the walls of said opening being flared to effect a decrease in velocity of the fluid when the plunger is in motion.

4. In a device of the class described, in combination, a chamber having a reduced portion, there being a constricted opening between the larger part of said chamber and said reduced portion, a fluid in said chamber and said opening, and a plunger adapted to operate in said chamber and having a stem passing through said reduced portion, the inner walls of said reduced portion being flared outwardly to effect an increase in the size of the opening.

5. In a device of the class described, in combination, a dash pot chamber having a restricted opening, a fluid in said chamber, a plunger adapted to operate in said chamber and tending to force the contents of said dash pot through said opening, the walls of said opening being flared to effect an increase in the area of said opening.

6. In a device of the class described, in combination, a dash pot chamber having an opening, a fluid in said chamber, a plunger adapted to operate in said chamber and tending to force the contents thereof through said opening, the walls of said opening being flared outwardly from said chamber to effect an increase in the area of said opening, and means accessible exteriorly of said chamber for introducing the fluid into the chamber to a level above said opening.

FREMONT H. BUCKINGHAM.